(12) United States Patent
Nakayama et al.

(10) Patent No.: US 6,558,645 B2
(45) Date of Patent: May 6, 2003

(54) METHOD FOR MANUFACTURING CARBON NANOCOILS

(75) Inventors: Yoshikazu Nakayama, 9-404, 14-2, Korigaoka 1-chome, Hirakata-city, Osaka 573-0084 (JP); Mei Zhang, Sakai (JP); Akio Harada, Osaka (JP)

(73) Assignees: Yoshikazu Nakayama, Osaka (JP); Daiken Chemical Co., Ltd., Osaka (JP)

( * ) Notice: Subject to any disclaimer, the term of this patent is extended or adjusted under 35 U.S.C. 154(b) by 52 days.

(21) Appl. No.: 09/901,991

(22) Filed: Jul. 10, 2001

(65) Prior Publication Data

US 2003/0012721 A1 Jan. 16, 2003

(51) Int. Cl.$^7$ .................................................. D01F 9/12
(52) U.S. Cl. .............................. 423/445 B; 423/447.1; 423/447.3; 423/445 R
(58) Field of Search .................. 423/445 B, 447.1, 423/447.3, 445 R (56) References Cited

U.S. PATENT DOCUMENTS 5,401,975 A  *  3/1995  Ihara et al. .............. 250/492.3
5,413,866 A  *  5/1995  Baker et al. .............. 423/447.2

OTHER PUBLICATIONS

Hernandi et al., "Growth and Microstructure of Catalytically Produced Coiled Carbon Nanotubes", J. Phys. Chem B, 105, 2001, pp. 12464–12468.*

* cited by examiner

Primary Examiner—Stuart L. Hendrickson
Assistant Examiner—Peter J Lish
(74) Attorney, Agent, or Firm—Koda & Androlia (57) ABSTRACT

A method for manufacturing carbon nanocoils which are grown by winding carbon atoms in a helical configuration and which have an external diameter of 1000 nm or less, the method comprising the steps of: placing an indium-tin-iron type catalyst inside a reactor, heating an area around the catalyst to a temperature equal to or greater than temperature at which hydrocarbon used as a raw material is broken down by an action of the catalyst, causing hydrocarbon gas to flow through the reactor so that the gas contacts the catalyst, and allowing carbon nanocoils to grow on a surface of the catalyst while the hydrocarbon is broken down in the vicinity of the catalyst. The indium-tin-iron type catalyst may be obtained by: a mixed catalyst of indium oxide and tin oxide, and a thin film of iron which is formed on a surface of this mixed catalyst.

7 Claims, 8 Drawing Sheets

METHOD FOR MANUFACTURING CARBON NANOCOILS

BACKGROUND OF THE INVENTION

1. Field of the Invention

The present invention relates to a method for manufacturing carbon nanocoils that are grown by winding carbon atoms in a helical configuration and in which the external diameter of the coil is 1000 nm or less. More specifically, the present invention relates to a method for manufacturing carbon nanocoils which utilizes an indium-tin-iron type catalyst and in which carbon nanocoils are efficiently grown on the surface of the catalyst while a hydrocarbon gas is under pyrolysis.

2. Prior Art

The growth of carbon fibers in a vapor phase while the fibers are twisted in the manner of a rope was first reported by Davis et al. (W. R. Davis, R. J. Slawson and G. R. Rigby, Nature, 171, 756 (1953)). Since the external diameter of such carbon ropes is microscopic in size, such ropes will be referred to below as carbon microcoils. Subsequently, various reports appeared concerning carbon microcoils; however, since there was a strong element of randomness involved in the production of such coils, these coils lacked reproducibility, and remained in a state that was inadequate for industrial production.

In 1990, Motojima et al. (S. Motojima, M. Kawaguchi, K. Nozaki and H. Iwanaga, Appl. Phys. Lett., 56 (1990) 321) discovered an efficient method for manufacturing carbon microcoils, and as a result of subsequent research, these researchers established a manufacturing method that showed reproducibility. In this method, a graphite substrate which is coated with a powdered Ni catalyst is placed inside a horizontal type externally heated reaction tube made of transparent quartz, and a raw-material gas is introduced perpendicularly onto the surface of the substrate from a raw-material gas introduction part located in the upper part of the reaction tube. This raw-material gas is a mixed gas of acetylene, hydrogen, nitrogen and thiophene. The exhaust gas is discharged from the bottom part of the reactiontube.

In particular, impurities such as sulfur and phosphorus, etc., are indispensable; if the amounts of these impurities are too large or too small, carbon microcoils will not grow. For example, the coil yield reaches a maximum, at a value of approximately 50%, in a case where thiophene containing sulfur is added at the rate of 0.24% relative to the total gas flow. The reaction temperature is approximately 750 to 800° C.

The diameter of the fibers constituting such carbon microcoils is 0.01 to 1 $\mu$m, the external diameter (outside diameter) of the coils is 1 to 10 $\mu$m, the coil pitch is 0.01 to 1 $\mu$m, and the coil length is 0.1 to 25 mm. Such carbon microcoils have a completely amorphous structure, and have superior physical properties such as electromagnetic wave absorption characteristics, etc., so that these microcoils show promise as electromagnetic wave absorbing materials.

In 1991, carbon nanotubes were discovered. Spurred by this discovery, research concerning carbon coils on the nanometer scale, i.e., carbon nanocoils, was initiated. The reason for this was that on the nanometer scale, there was a possibility that new physical properties might be discovered, so that such nanocoils showed promise as new materials in electronics and engineering, etc., in the nanometer region. However, the development of such carbon nanocoils was not easy.

In 1994, Amelinckx et al. (Amelinckx, X. B. Zhang, D. Bernaerts, X. F. Zhang, V. Ivanov and J. B. Nagy, SCIENCE, 265 (1994) 635) succeeded in producing carbon nanocoils. It was also demonstrated that while carbon microcoils are amorphous, carbon nanocoils have a graphite structure. Various types of carbon nanocoils were manufactured, and the minimum external diameter of these nanocoils was extremely small, i.e., approximately 12 nm.

The manufacturing method used by the abovementioned researchers was a method in which a metal catalyst such as Co, Fe or Ni is formed into a fine powder, the area around this catalyst is heated to a temperature of 600 to 700° C., and an organic gas such as acetylene or benzene is caused to flow through so that this gas contacts the catalyst, thus breaking down these organic molecules. The substance produced as a result consists of carbon nanotubes with a graphite structure, and the shapes of these nanotubes are linear, curvilinear, planar spiral and coil form, etc. In other words, it will be understood that carbon nanocoils are only produced by chance, so that the coil yield is also small.

In 1999, Li et al. (W. Li, S. Xie, W. Liu, R. Zhao, Y. Zhang, W. Zhou and G. Wang, J. Material Sci., 34 (1999) 2745) succeeded again in producing carbon nanocoils. In the manufacturing method used by these researchers, a catalyst formed by covering the outer circumference of a graphite sheet with iron particles was placed in the center [sic], and the area around this catalyst was heated to 700° C. by means of a nichrome wire. A mixed gas consisting of 10% acetylene and 90% nitrogen by volume was caused to flow through so that this gas contacted the catalyst. The flow rate of this gas was set at 1000 cc/min. The carbon nanocoils that were produced had various external diameters; the smallest nanocoils had diameters of 20 nm or 22 nm. However, this manufacturing method also showed a small coil production rate, and was extremely inadequate as an industrial production method.

Thus, a common feature of carbon coil production methods is that acetylene is used as a raw-material gas, and carbon coils are grown by means of a catalyst while pyrolyzing this acetylene. If thiophene is used as a trace gas on a Ni catalyst, a large quantity of carbon microcoils can be produced; on the other hand, if an iron catalyst is used, carbon nanocoils can be produced, although in an extremely small quantity. In other words, the development of a catalyst appears to hold the key to large-quantity production of carbon nanocoils.

SUMMARY OF THE INVENTION

Accordingly, the object of the present invention is to realize a mass production method for carbon nanocoils by developing an appropriate catalyst.

The above object is accomplished by unique steps of the present invention in a carbon nanocoil manufacturing method that manufactures carbon nanocoils which are grown by winding carbon atoms in a helical configuration and which have an external diameter of 1000 nm or less; and the unique steps of the present invention comprises:

placing an indium-tin-iron type catalyst with a desired form inside a reactor, heating the area around the catalyst to a temperature equal to or greater than the temperature at which the hydrocarbon used as a raw material is broken down by the action of the catalyst, causing a hydrocarbon gas to flow through the reactor so that this gas contacts the catalyst, and allowing carbon nanocoils to grow on the surface of the catalyst while the hydrocarbon is broken down in the vicinity of the catalyst.

In the above method, the carbon nanocoils are formed by the growth of carbon nanotubes wound in a helical configuration.

Also, the indium-tin-iron type catalyst is constructed from a mixed catalyst of indium oxide and tin oxide, and a thin film of iron which is formed on the surface of this mixed catalyst.

Furthermore, the mixed catalyst consists of a thin film of a mixed catalyst of indium oxide and tin oxide formed on the surface of a glass substrate. In addition, the hydrocarbon is acetylene.

The indium-tin-iron type catalyst can be arranged (dispersed or sprayed) as a particle form inside the reactor. Moreover, the indium-tin-iron type catalyst can be arranged on the surface of a cylinder placed inside the reactor, and the cylinder can be rotated in the reactor.

DETAILED DESCRIPTION OF THE INVENTION

The inventors of the present patent application conducted diligent research concerning the synthesis of carbon nanocoils in large quantities. As a result of this research, the inventors discovered that it is extremely effective to use an indium-tin-iron type catalyst as the catalyst in such synthesis. This discovery led to the perfection of the present invention.

In the past, mainly metal catalysts such as iron, cobalt and nickel have been used in the synthesis of carbon coils. It is also known that carbon nanocoils can be synthesized, although in extremely small quantities, in cases where iron is used as a catalyst. Accordingly, on the grounds that iron is an essential element for the synthesis of carbon nanocoils, it was decided to investigate what other elements might be added to this iron element.

Generally, metal thin films and metal oxide thin films are used as transparent conductive films in semiconductors. From this standpoint, it appears that metal oxides have not yet been investigated as catalysts in place of metals. Accordingly, the present inventors investigated $In_2O_3$, $SnO_2$ and mixtures of $In_2O_3$ and $SnO_2$ as metal oxides. These metal oxides are transparent conductive film materials that are widely used in the semiconductor field, and the mixtures of $In_2O_3$ and $SnO_2$ are called "ITO" as an abbreviation of indium-tin-oxide. This ITO is a mainstream transparent conductive film product commercially marketed as ITO substrates (in which ITO films are formed on glass substrates), and can be obtained inexpensively from the marketplace.

Carbon nanocoil synthesis experiments were performed using various types of catalysts combining the abovementioned metal catalysts and metal oxide catalysts, in order to determine which catalysts were most suitable. First, in a case where an iron catalyst is vacuum-evaporated on a glass substrate or Si substrate, only carbon nanotubes that grow along the direction perpendicular to the substrate surface can be synthesized. Secondly, in cases where only an ITO substrate or other substrate ($SnO_2$, Si or glass) is used, only an extremely thin amorphous carbon film is formed, since no thin film of iron is present.

Third, in the case of a substrate in which a thin film of tin was formed on the surface of an iron plate, it was possible to produce an extremely small quantity of carbon nanocoils. For the most part, however, carbon tube fibers with various diameters were grown.

Fourth, in the case of a substrate in which a thin film of tin oxide was formed on the surface of a glass substrate, and a thin film of iron was formed on the surface of a portion of the thin film of tin oxide, carbon tube fibers were deposited only on the thin film of iron.

Fifth, in the case of a substrate in which a thin film of iron was formed on the surface of a portion of the ITO substrate, a large quantity of carbon nanocoils was produced on the surface of the thin film of iron, while only an amorphous carbon film was produced in areas other than the thin film of iron. Sixth, when a mixture of metallic In and metallic Sn was vacuum-evaporated on the surface of a glass substrate, and a thin film of iron was formed over this entire surface (after experiencing the abovementioned success), carbon nanocoils were produced over the entire surface of the thin film of iron.

It appears from these results that a combination of In atoms and Sn atoms causes carbon atoms to grow in a spiral configuration, and that Fe atoms have an effect that causes growth in the axial direction, so that carbon nanocoils grow as a synthesis of spiral growth and axial growth. Accordingly, it may be concluded that the use of an indium-tin-iron type catalyst is an effective method for the large-quantity high-yield production of carbon nanocoils.

As described above, ITO substrates are substrates in which an ITO thin film is formed on a glass substrate. Since ITO substrates can be obtained inexpensively from the marketplace, and since an element in which a thin film of iron is formed on such an ITO substrate is effective as a catalyst, carbon nanocoils can be produced in large quantities at a low cost using such a substrate. ITO is a mixture of $SnO_2$ and $In_2O_3$; in more concrete terms, Sn is added as a dopant to $In_2O_3$. There are no limits on the rate of addition. Generally, however, the Si/In ratio is 0.01 to 0.5, preferably 0.02 to 0.3.

ITO films have a high light transmissivity and a high conductivity, and are also advantageous in that high-quality films can be molded at a relatively low temperature by means of a physical film manufacturing method. Furthermore, film formation on plastic surfaces is also possible. ITO film manufacturing methods include (for example) spraying on a glass surface, vapor-phase reaction methods, coating methods, vacuum evaporation methods, sputtering methods and ion plating methods, etc.

The ITO film can be formed not only as a film on the substrate but also as ITO particles. When the iron thin film is formed on the ITO particles, and these catalyst particles are sprayed in the reactor, the carbon nanocoils grow on the catalyst particles in the dropping process in the reactor. Of course, the indium-tin-iron type catalyst may be formed as particles.

In another method, the indium-tin-iron catalyst is coated on a portion of the surface of a cylinder arranged in the reactor, and the carbon nanocoils grow on the catalyst with a rotation of the cylinder. After the carbon nanocoils are collected by a scraper at a specified position, the catalyst is coated again and these steps are repeated.

Catalytic decomposition of a hydrocarbon gas is used in order to manufacture carbon nanocoils. Examples of hydrocarbons that can be used include various types of alkanes such as methane or ethane, as well as alkenes, alkynes and aromatic hydrocarbons, etc. In particular, acetylene, allylene and benzene, etc., are especially effective, and acetylene shows an especially high efficiency. Furthermore, a temperature that is equal to or higher than the temperature at which the hydrocarbon is broken down by the action of the catalyst is effective as the heating temperature. The thermal decomposition temperature of acetylene is approximately 400° C. In this case, a temperature of approximately 600 to approximately 800° C. is suitable as the synthesis temperature of carbon nanocoils using acetylene. However, the synthesis temperature is not limited to such a temperature. The temperature can be freely set with the synthesis efficiency being taken into account as long as the temperature used is equal to or higher than the catalytic decomposition temperature of the hydrocarbon.

EXAMPLES

Figure 1:
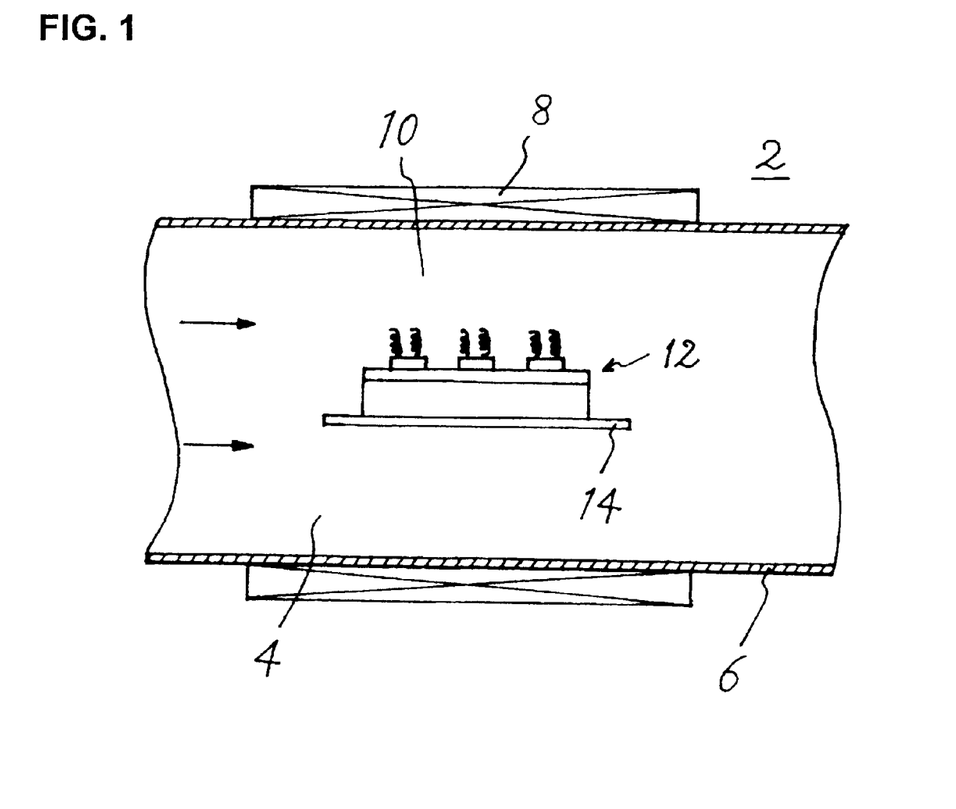
FIG. 1 is a schematic structural diagram of the carbon nanocoil manufacturing apparatus of the present invention.

FIG. 1 is a schematic structural diagram of the carbon nanocoil manufacturing apparatus of the present invention.

This manufacturing apparatus 2 is a flow reactor which is placed under atmospheric pressure. The reaction chamber 4 is surrounded by a quartz tube 6 that has a diameter of 30 mm and a length of 700 mm. A tube-form heater 8 having a length of 450 mm is installed around the outer circumference of the central portion of the quartz tube 6, and the center of the reaction chamber 4 is set in an isothermic region 10 over a length of approximately 50 mm. A semi-cylindrical quartz boat 14 which carries a growth substrate 12 is disposed in this isothermic region 10.

Figure 2:
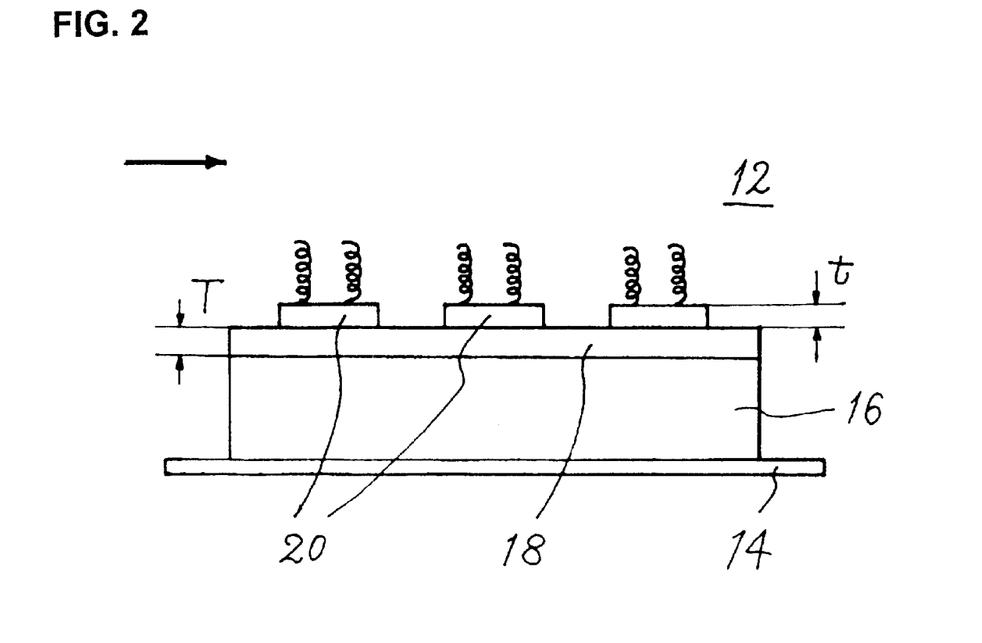
FIG. 2 is an enlarged view of the growth substrate in FIG. 1.

FIG. 2 is an enlarged view of the growth substrate 12.

The growth substrate 12 is constructed by coating the upper surface of a glass substrate 16 with an indium-tin oxide thin film 18 (hereafter referred to as an "ITO thin film"). The thickness T of the ITO thin film 18 is 300 nm. Iron thin films 20 are formed on the surface of this ITO thin film 18 by vacuum evaporation via a shadow mask. The thickness t of these iron thin films 20 is 15 nm. A plurality of 2 mm×5 mm rectangular aperture parts are formed in the shadow mask at a pitch of 2 mm. Accordingly, iron thin films 20 of a corresponding size are formed.

First, the interior of the quartz tube 6 was filled with helium gas, and the temperature of the growth substrate 12 was elevated to 700° C. at a temperature elevation rate of 15° C. per minute. This helium gas was introduced in order to prevent the metals from being oxidized inside the reaction chamber. After a temperature of 700° C. was reached, ⅓ of the helium gas was replaced with acetylene, and the total flow rate of this mixed gas of helium and acetylene was adjusted to 260 sccm. The reaction time was set at approximately 1 hour; afterward, the acetylene was cut off so that only helium was caused to flow, and the growth substrate 12 was gradually cooled to room temperature in this helium atmosphere.

The growth substrate 12 was analyzed using a scanning electron microscope (SEM S-4500 manufactured by Hitachi) and an SEM-equipped energy dispersion X-ray analysis device (EDX). Only an extremely thin amorphous carbon film is present on the surface of the ITO thin film 18 where no iron thin films 20 are present. On the other hand, carbon nanocoils grow at a high density on the surfaces of the rectangular iron thin films 20.

Figure 3:
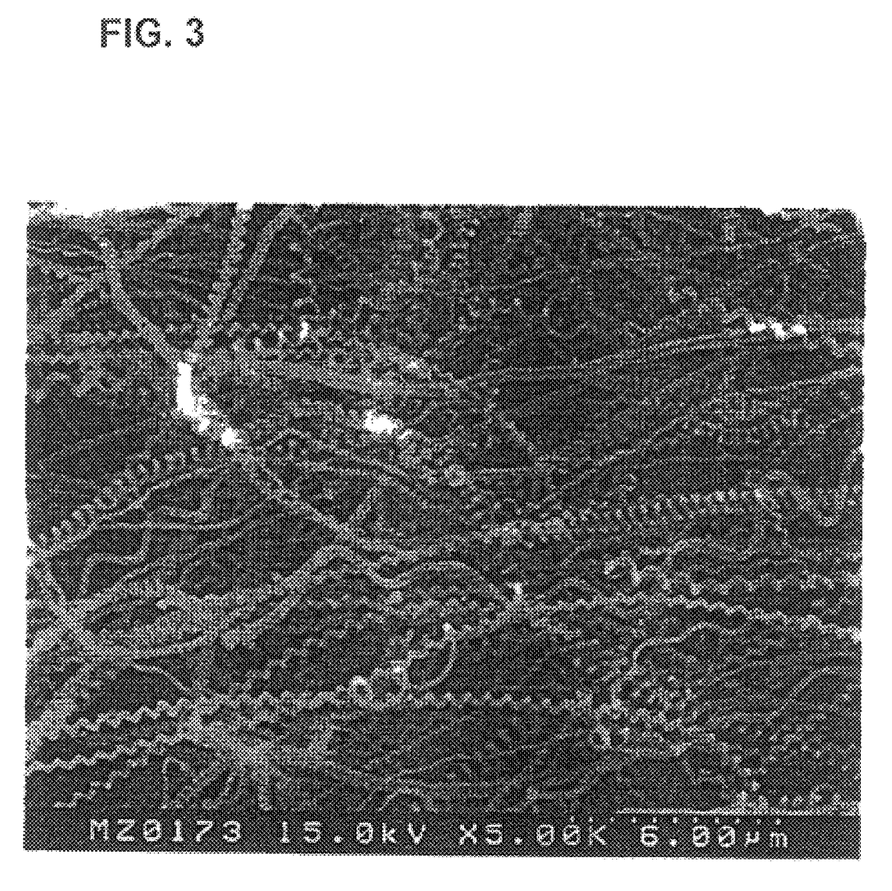
FIG. 3 is an electron micrograph of carbon nanocoils grown on the iron thin film.

FIG. 3 is an electron micrograph of carbon nanocoils grown on the surfaces of the iron thin films. The coil yield is estimated at 95% from the amount of carbon atom deposition and the quantity of coils produced. This indicates that the present manufacturing method has an extremely high efficiency.

Figure 4:
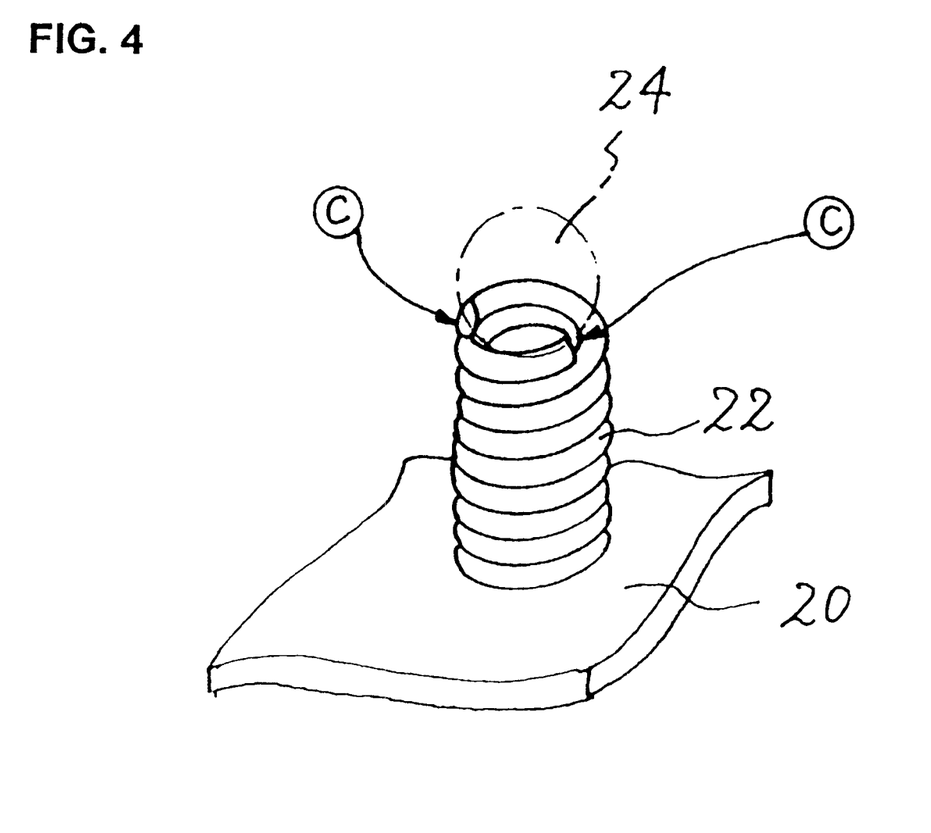
FIG. 4 is a diagram of the growth mechanism, which illustrates the carbon nanocoil growth process.

FIG. 4 is a diagram of the growth mechanism which illustrates the carbon nanocoil growth process. The carbon nanocoil growth mechanism is still not thoroughly understood; this diagram illustrates some of the tentative conclusions of the present inventors. When the acetylene molecule reaches the vicinity of the iron thin films 20, this acetylene is pyrolyzed into carbon atoms and hydrogen molecules as a result of the effects of the ambient temperature and catalytic action. On the iron thin films, the carbon atoms C grow in a spiral configuration as a result of the effects of the In atoms and Sn atoms. At the same time, these carbon atoms C growth in the axial direction as a result of the effect of the Fe atoms. As a result, the carbon atoms grow three-dimensionally as carbon nanocoils 22.

It is surmised that atomic clusters 24 consisting of In atoms, Sn atoms and Fe atoms are carried on the tip ends of the carbon nanocoils 22, and it appears that the carbon nanocoils 22 grow at the tip ends while successively incorporating carbon atoms beneath these atomic clusters 24. However, it cannot yet be determined whether the atomic clusters 24 that have a catalytic effect are carried on the upper surfaces of the coils as shown in the accompanying figures, or whether these clusters are small clusters that adhere to the tip ends of the carbon fibers that form the coils. Since tip end growth takes place, the possibility of the latter explanation is strong; at some point, this may be elucidated by electron micrographs.

Figure 5:
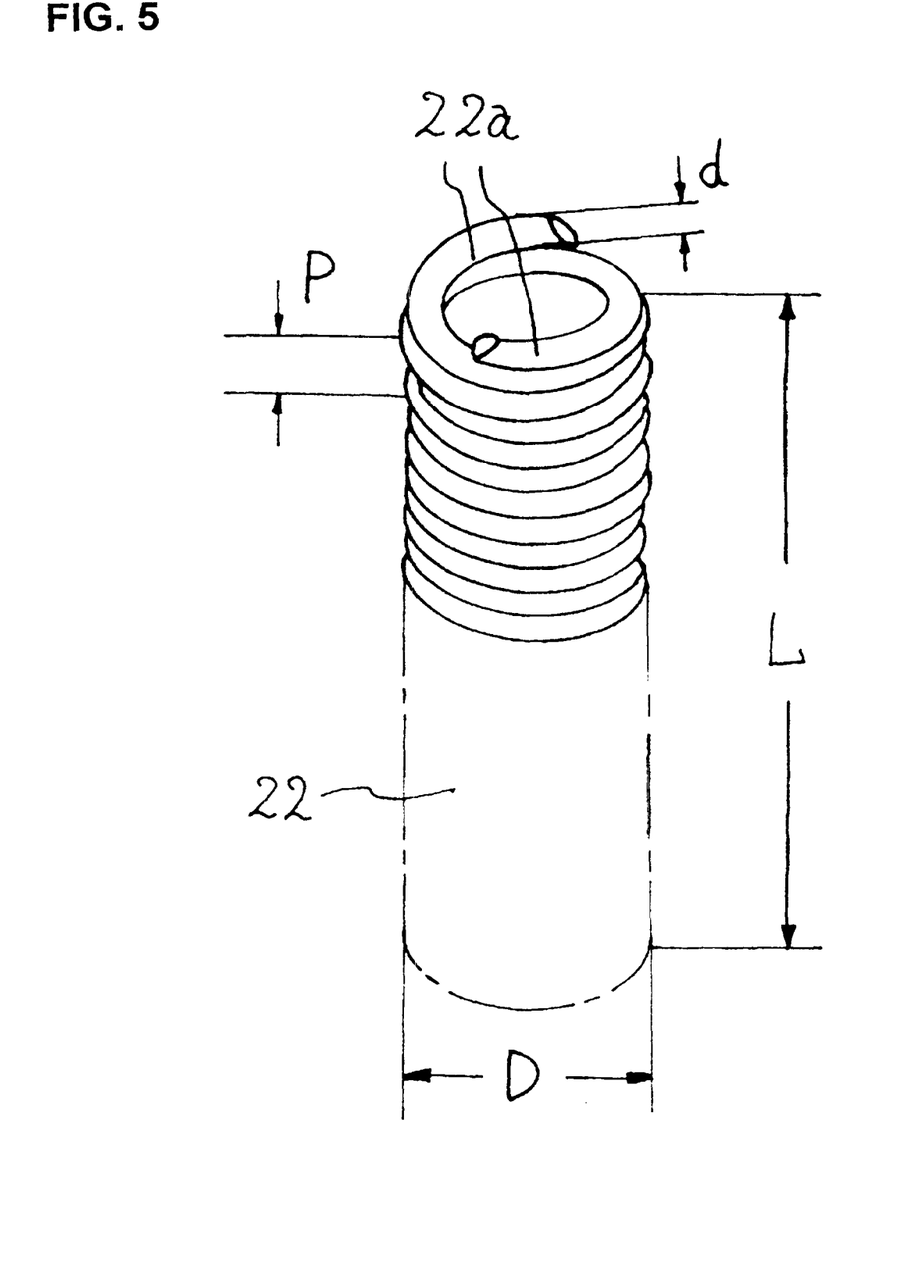
FIG. 5 is a perspective view of a carbon nanocoil.

FIG. 5 is a perspective view of a carbon nanocoil. This carbon nanocoil 22 is formed by two carbon fibers 22a being wound in the same direction. The winding direction may be either clockwise or counterclockwise. The number of carbon fibers 22a also varies; in some cases, there may be a single carbon fiber, while in other cases, the number of carbon fibers may be three or more, etc. In most cases, furthermore, these carbon fibers 22a are carbon nanotubes with hollow interiors. However, carbon fibers with solid interiors are also conceivable. The cross-sectional diameters d of these carbon fibers 22a have distribution ranging from several nanometers to several tens of nanometers.

Such carbon nanocoils 22 have various external diameters D and pitches P. However, it is interesting that a single coil grows at a specific pitch P and diameter D. The external diameters D of such coils range from several tens of nanometers to several hundred nanometers. In the present invention, coils with an external diameter D of 1000 nm or less are called carbon nanocoils. The coils grow in the direction perpendicular to the surface of the iron thin film 20. However, it cannot be said that the orientation of the overall coil is uniform. The coils grow to the outside of the substrate as the axial length of the coils is extended, and these coils show remarkably good self-organization as they grow. The axial length L depends on the growth time.

Figure 6:
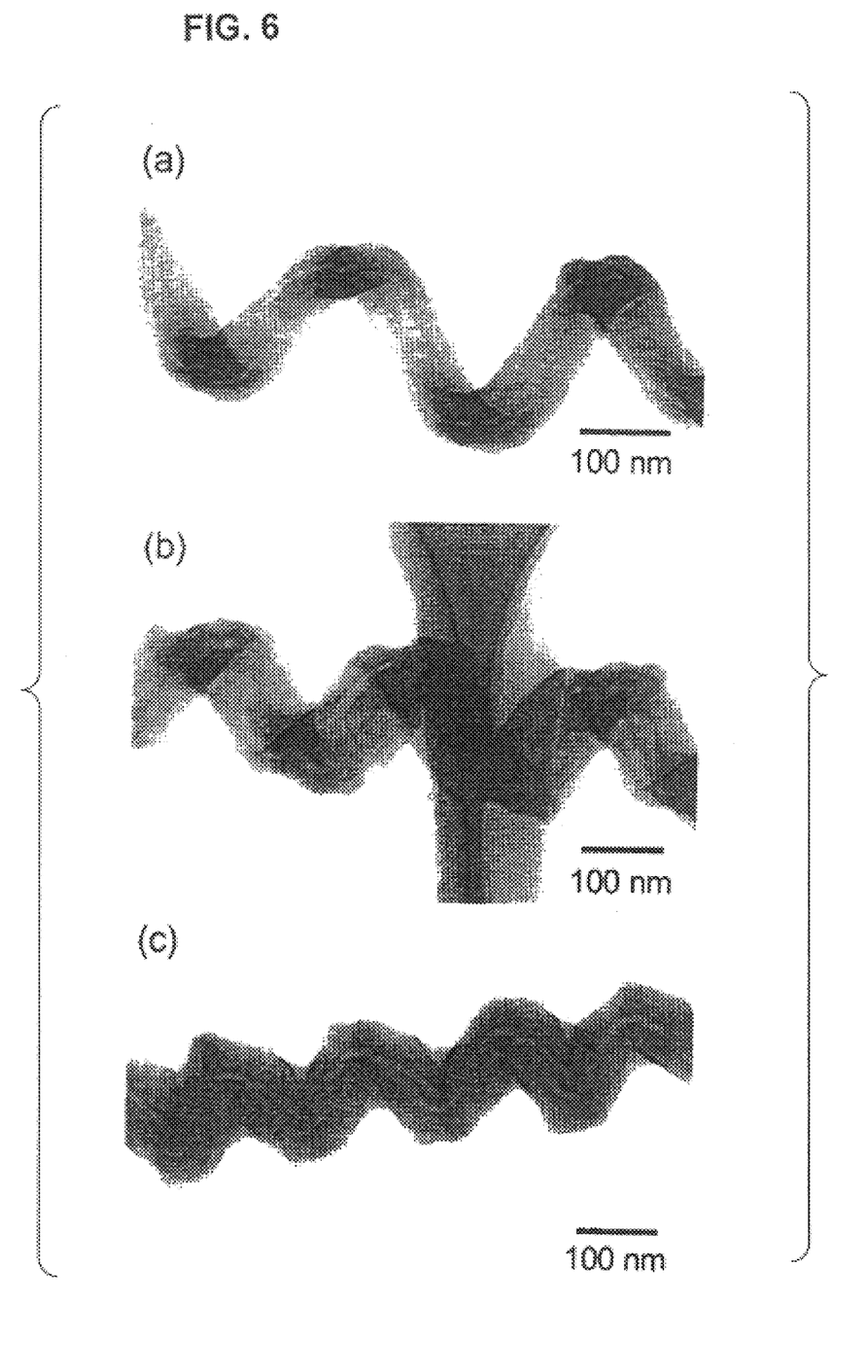
FIGS. 6(a) through 6(c) are electron micrographs (TEM images) showing various types of carbon nanocoils.
Figure 7:
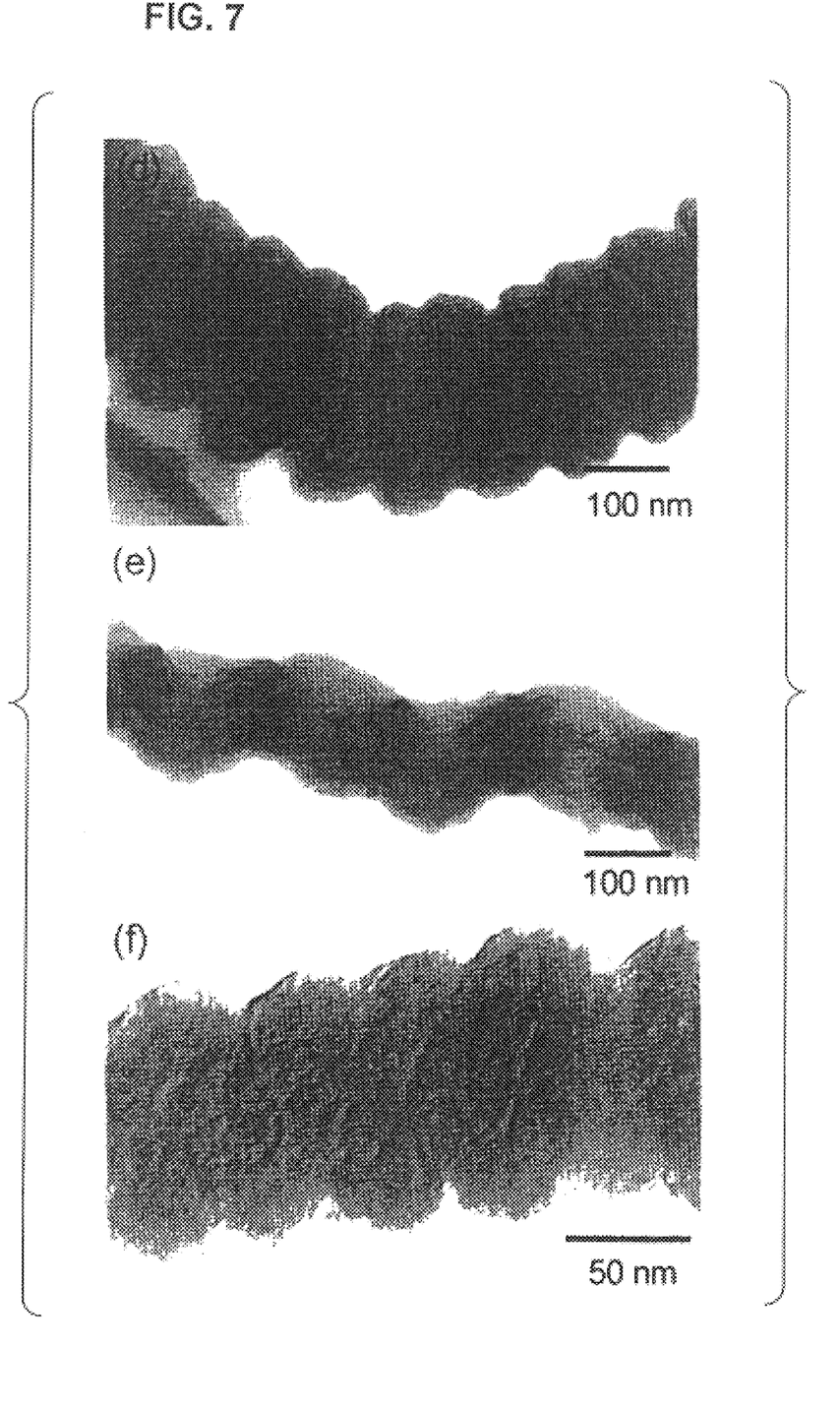
FIGS. 7(d) through 7(f) are electron micrographs (TEM images) showing various types of carbon nanocoils.

A transmission electron microscope (TEMJEM-2000F X II) was used for the further analysis of the synthesized carbon nanocoil. The carbon nanocoil deposits were picked up with tweezers and cleaned by ultrasound for 10 minutes in isopropyl alcohol. Then, several drops of a suspension of the carbon nanocoils were placed on the grid of the transmission electron microscope. FIGS. 6(a) through 6(c) and 7(d) through 7(f) show electron micrographs (TEM images) of various types of carbon nanocoils. These TEM observations indicate that the carbon fibers 22a that form the carbon nanocoils 22 are carbon nanotubes. The diameters d of these carbon nanotubes are approximately 30 to 40 nm. The white lines running along the winding of the coils in. FIGS. 6(a) and 7(f) indicate the hollow parts of the carbon nanotubes.

In most cases, as seen from 6(a) through 6(c) and 7(d) through 7(f), two or more carbon nanotubes form a coil. The shape of a carbon nanocoil is determined by the relationship between the nanotubes. If the carbon nanotubes are favorably bundled, so that these nanotubes coil at more or less the same phase and pitch, a coil which has circular bent portions is formed as shown in FIG. 6(a). If the carbon nanotubes coil at a different phase and pitch, then a ribbon-form coil (FIG. 6(b)), a fiber-form coil (FIG. 6(c)) or a thick coil with a small pitch (FIG. 7(d)) is formed. If several nanotubes grow together, and there are major differences in the diameters, pitches and phases of these nanotubes, then the coils appear as strongly compressed ropes (FIGS. 7(e) and 7(f)).

Figure 8:
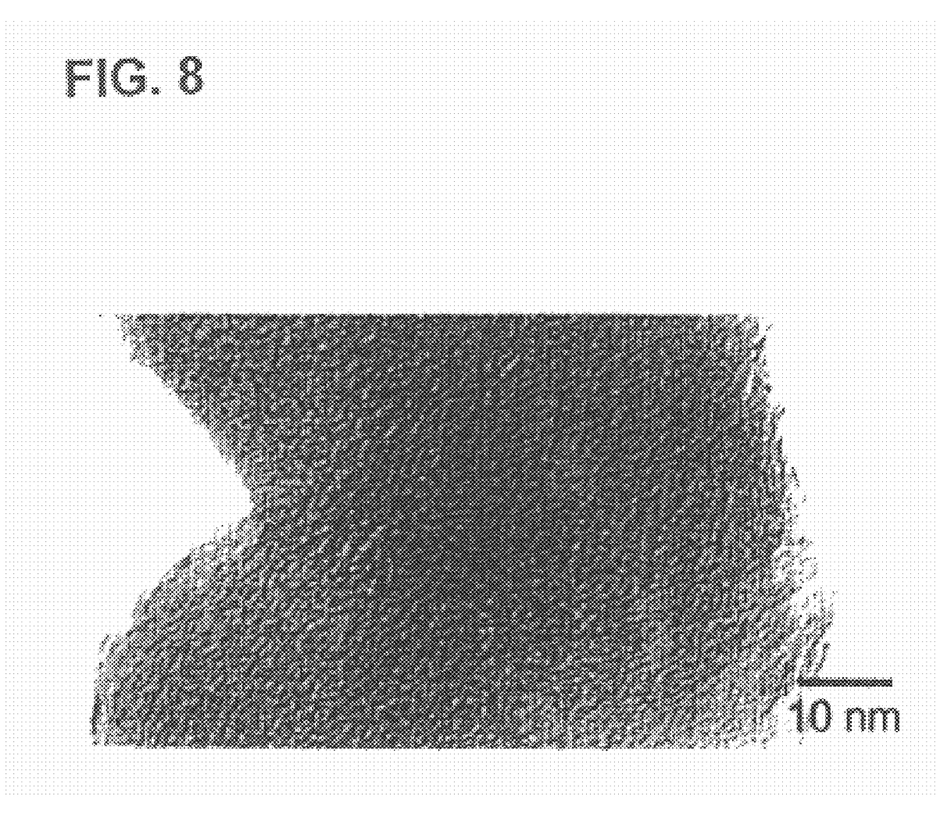
FIG. 8 shows an enlarged TEM image of a small coil.

FIG. 8 is an enlarged TEM image of a small coil. This coil is formed by two carbon nanotubes that are shifted in phase; the external diameter D of the coil is 50 nm. It is clear that the coil is formed by a multiple graphite structure. The inter-layer spacing of the fine parallel lines seen in the TEM image is 0.33 nm; this inter-layer spacing demonstrates the graphite structure. The axial length L of the coil depends on the reaction time. In the case of a CVD reaction time of 60 minutes, the length of the coil is approximately 300 microns. The carbon nanocoil production rate drops with a drop in the reaction temperature; however, it was verified by experiment that carbon nanocoils grow even at a low temperature of 620° C.

In the above examples, the indium-tin-iron type catalyst is manufactured by forming the iron film on ITO-film. However, other methods for manufacturing the catalyst can be used. It is important that indium, tin and iron are mixed in the catalyst.

The indium-tin-iron catalyst can be manufactured in any form including, for instance, plate, particle and block. In the case of particle, the carbon nanocoils are formed on the surface of the catalyst particles which are dropping in the reactor; and after the particles are collected in the bottom region, only the carbon nanocoils are separated from catalyst particles. In one example, the catalyst particles are formed by spraying the solution-like catalyst in the reactor.

In another method, the solution-like catalyst is coated on a portion of a cylinder arranged in the reactor, and the carbon nanocoils grow on the catalyst of the cylinder rotating in the reactor. The carbon nanocoils are collected by scraping the surface of the cylinder. The mass production of carbon nanocoils can be realized by repeating these steps.

The present invention is not limited to the embodiment described above. Various modifications and design alterations, etc., that involve no departure from the technical concept of the present invention are also included in the technical scope of the present invention.

As seen from the above, in the present invention, the use of an indium-tin-iron type catalyst makes it possible to produce carbon nanocoils at a high efficiency on the surface of the catalyst while efficiently decomposing the hydrocarbon raw material. The maximum yield of carbon nanocoils reaches 95% in some cases.

In addition, carbon nanocoils are formed by the growing of carbon nanotubes wound in a helical configuration. Accordingly, since the cross-sectional diameter d of the carbon nanotubes is small, carbon nanocoils with a small cross-sectional diameter D can be produced.

Furthermore, the indium-tin-iron type catalyst is constructed from a mixed catalyst of indium oxide and tin oxide, and an iron thin film that is formed on the surface of this mixed catalyst. Accordingly, indium oxide and tin oxide that are commonly used in the transparent electrodes of semiconductors can be used, so that the indium-tin-iron type catalyst can easily be constructed.

In addition, a mixed catalyst thin film of indium oxide and tin oxide formed on the surface of a glass substrate can be used as the mixed catalyst described above. Accordingly, a mixed catalyst thin film can be provided using a commercially marketed ITO substrate, so that the indium-tin-iron type catalyst can easily be constructed.

Furthermore, in the present invention, acetylene can be used as the raw-material hydrocarbon. Accordingly, the acetylene industry can be activated, and carbon nanocoils can be manufactured at low cost.

What is claimed is:

1. A method for manufacturing carbon nanocoils which are grown by winding carbon atoms in a helical configuration and which have an external diameter of 1000 nm or less, said method comprising the steps of:

placing an indium-tin-iron catalyst inside a reactor, heating an area around said catalyst to a temperature equal to or greater than temperature at which hydrocarbon used as a raw material is broken down by an action of said catalyst, causing hydrocarbon gas to flow through said reactor so that said gas contacts said catalyst, and allowing carbon nanocoils to grow on a surface of said catalyst while said hydrocarbon is broken down in the vicinity of said catalyst.

2. The method for manufacturing carbon nanocoils according to claim 1, wherein said carbon nanocoils are formed by growing carbon nanotubes wound in a helical configuration.

3. The method for manufacturing carbon nanocoils according to claim 1, wherein said indium-tin-iron catalyst is constructed from:

a mixed catalyst of indium oxide and tin oxide, and a thin film of iron which is formed on a surface of said mixed catalyst.

4. The method for manufacturing carbon nanocoils according to claim 3, wherein said mixed catalyst consists of:

a thin film of a mixed catalyst of indium oxide, and tin oxide formed on a surface of a glass substrate.

5. The method for manufacturing carbon nanocoils according to any one of claims 1 through 4, wherein said hydrocarbon is acetylene.

6. The method for manufacturing carbon nanocoils according to claim 1, wherein said indium-tin-iron catalyst is disposed in the reactor as particles by spraying means.

7. The method for manufacturing carbon nanocoils according to claim 1, wherein said indium-tin-iron catalyst is coated on a cylinder rotating in the reactor.

* * * * *